US012307935B2

(12) United States Patent
Wang et al.

(10) Patent No.: US 12,307,935 B2
(45) Date of Patent: May 20, 2025

(54) DISPLAY CONTROL INTEGRATED CIRCUIT APPLICABLE TO PERFORMING VIDEO OUTPUT GENERATOR RESET CONTROL IN DISPLAY DEVICE

(71) Applicant: Realtek Semiconductor Corp., HsinChu (TW)

(72) Inventors: Hsueh-Ping Wang, HsinChu (TW); Chi-Hsiung Cheng, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 9 days.

(21) Appl. No.: 17/695,811

(22) Filed: Mar. 15, 2022

(65) Prior Publication Data

US 2023/0106022 A1 Apr. 6, 2023

(30) Foreign Application Priority Data

Oct. 4, 2021 (TW) ................................ 110136927

(51) Int. Cl.
*G09G 3/20* (2006.01)

(52) U.S. Cl.
CPC ....... *G09G 3/20* (2013.01); *G09G 2300/0408* (2013.01); *G09G 2300/0814* (2013.01); *G09G 2310/061* (2013.01); *G09G 2310/08* (2013.01)

(58) Field of Classification Search
None
See application file for complete search history.

(56) References Cited

U.S. PATENT DOCUMENTS

2014/0029910 A1* 1/2014 Maruyama ....... H04N 21/43074 386/220
2016/0212393 A1* 7/2016 Fujioka ................ H04N 9/3179
2018/0061305 A1* 3/2018 Li ............................ G09G 3/20
2018/0314483 A1* 11/2018 Liu ....................... G06F 3/1446

* cited by examiner

*Primary Examiner* — Amr A Awad
*Assistant Examiner* — Donna V Bocar
(74) *Attorney, Agent, or Firm* — Winston Hsu

(57) ABSTRACT

A display control integrated circuit (IC) applicable to performing video output (VO) generator reset control in a display device includes multiple sub-circuits such as a VO generator and a display output control circuit. The VO generator generates an input vertical synchronization (IVS) signal for controlling playback of video data. The display output control circuit performs display output control, and more particularly, generates a set of display control signals to control a display output module within the display device to perform display operations. The set of display control signals may include a display vertical synchronization (DVS) signal for being used as timing reference of a timing controller within the display output module. During a time interval between time points when two consecutive pulses carried by the DVS signal appear, the display output control circuit sends a reset signal to the VO generator at an intermediate time point to reset it.

10 Claims, 7 Drawing Sheets

DISPLAY CONTROL INTEGRATED CIRCUIT APPLICABLE TO PERFORMING VIDEO OUTPUT GENERATOR RESET CONTROL IN DISPLAY DEVICE

BACKGROUND OF THE INVENTION

1. Field of the Invention

The present invention relates to display control, and more particularly, to a display control integrated circuit applicable to performing video output generator reset control in a display device.

2. Description of the Prior Art

According to the related art, a main control chip of a display device may output some signals to a display panel, to allow the display panel to receive the video information output by the main control chip according to these signals. The main control chip may be designed to generate an internal synchronization signal to complete some internal operations. However, certain problems may occur. For example, the phase relationship between the internal synchronization signal and a certain signal of these synchronization signals mentioned above may be random, which may cause the main control chip to fail to operate normally. Some suggestions have been proposed in the related art to try solving this problem, but may lead to additional problems such as some side effects. Therefore, there is a need for a novel method and associated architecture to realize a display device with reliable display control without introducing side effects or in a way that is less likely to introduce a side effect.

SUMMARY OF THE INVENTION

An object of the present invention is to provide a display control integrated circuit applicable to performing video output generator reset control in a display device, to solve the above problems.

Another object of the present invention is to provide a display control integrated circuit applicable to performing video output generator reset control in a display device, in order to ensure normal operations of the display device.

At least one embodiment of the present invention provides a display control integrated circuit which is applicable to performing video output generator reset control in a display device. The display control integrated circuit may comprise: a video output generator; and a display output control circuit coupled to the video output generator. The video output generator can be arranged to generate an input vertical synchronization signal for controlling playback of video data. The display output control circuit can be arranged to perform display output control, wherein the display output control circuit generates a set of display control signals to control a display output module within the display device to perform display operations, and the set of display control signals comprise a display vertical synchronization signal for being used as timing reference of a timing controller within the display output module. In addition, during a time interval between a first time point and a second time point at which two consecutive pulses among a plurality of pulses carried by the display vertical synchronization signal respectively appear, the display output control circuit can output a reset signal to the video output generator at an intermediate time point corresponding to a predetermined timing ratio to reset the video output generator, to make timing of the input vertical synchronization signal be associated with timing of the display vertical synchronization signal, wherein the first time point is earlier than the second time point.

One of the advantages of the present invention is that, through a carefully designed display control mechanism, the display control integrated circuit of the present invention can quickly make the timing of the input vertical synchronization signal be associated with the timing of the display vertical synchronization signal, and more particularly, achieve frame lock, for example, the respective frame rates of the input vertical synchronization signal and the display vertical synchronization signal are equal to each other or have a multiple relationship. In addition, the display control integrated circuit of the present invention can effectively reduce the time to achieve frame lock, for example, complete frame lock within two frames, in order to properly control the display operations. Additionally, the display control integrated circuit of the present invention can prevent the problems of the related art, such as the problem that the display panel enters a protection mode and stops displaying. In comparison with the related art, the display control integrated circuit of the present invention can realize a display device with robust display control without introducing side effects or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
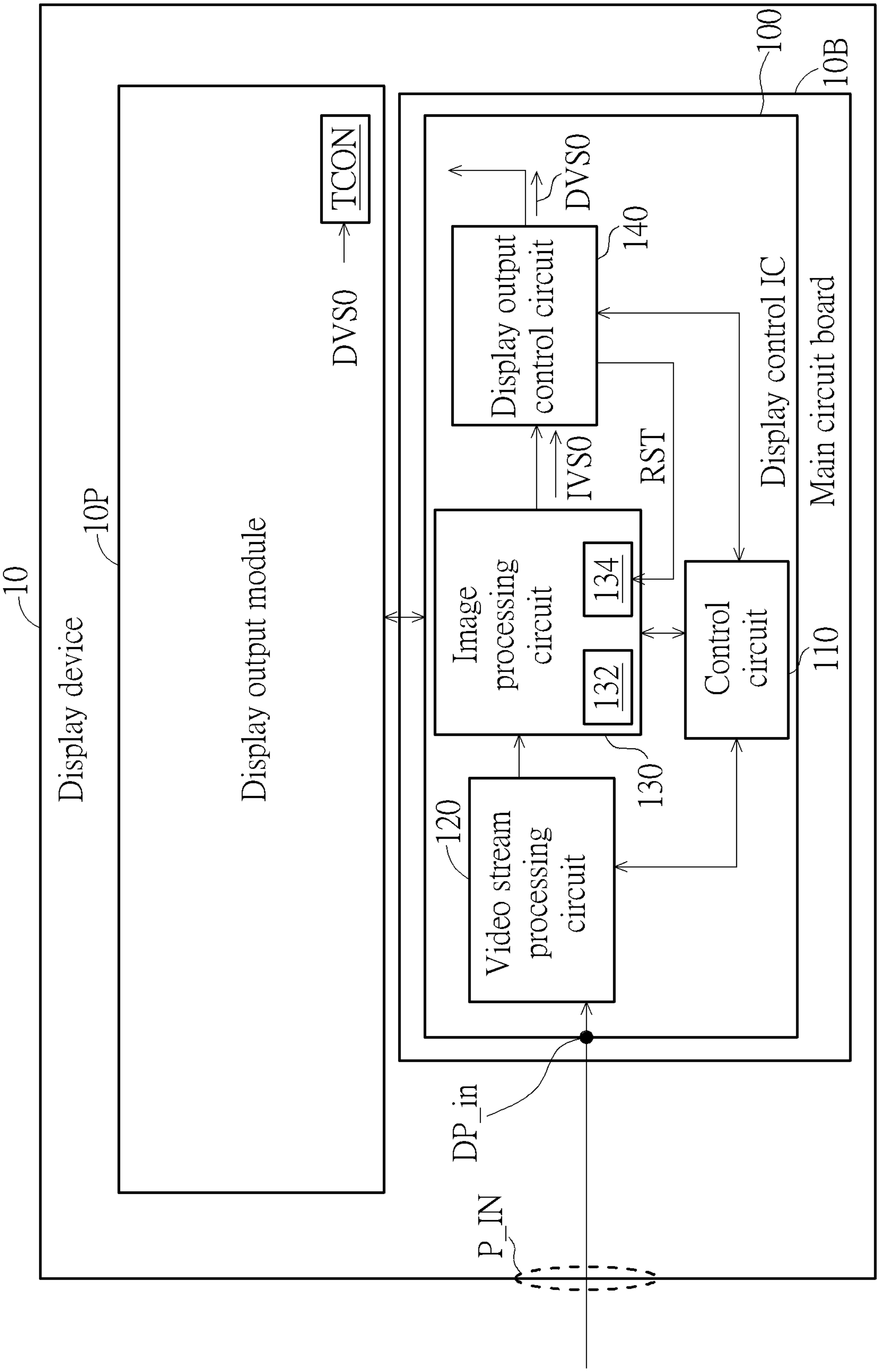
FIG. 1 is a diagram of a display control integrated circuit applicable to performing video output generator reset control in a display device according to an embodiment of the present invention.

FIG. 1 is a diagram of a display control integrated circuit (IC) 100 applicable to performing video output (VO) generator reset control in a display device 10 according to an embodiment of the present invention, wherein the display control IC 100 can be positioned in the display device 10, and more particularly, can be mounted on a main circuit board 10B (e.g., a printed circuit board) of the display device 10, but the invention is not limited thereto. In some embodiments, the main circuit board 10B can be replaced with another circuit board in the display device 10, such as any secondary circuit board of one or more secondary circuit boards.

The display device 10 may comprise a display output module 10P (e.g., a display panel such as a Liquid Crystal Display (LCD) panel), the main circuit board 10B together with the display control IC 100 thereon and a video input port P_IN, and the display control IC 100 may comprise a plurality of terminals such as a video input terminal DP_in, and may comprise a plurality of sub-circuits such as a control circuit 110, a video stream processing circuit 120, an image processing circuit 130 and a display output control circuit 140, where the image processing circuit 130 may comprise a video decoder 132 and a VO generator 134. The control circuit 110 can control the remaining sub-circuits among the plurality of sub-circuits to control the operations of the display control IC 100, for example, utilize the image processing circuit 130 to perform image processing on an input image to generate a processed image for being displayed.

In the architecture shown in FIG. 1, the main circuit board 10B (e.g., the display control IC 100 therein) can control the operations of the display device 10, for example, utilize the display output module 10P to display one or more images, and utilize the display output module 10P to perform on-screen display (OSD) to guide a user to interact with the display device 10 (e.g., provide one or more user inputs to the display device 10) through a user input device (e.g., one or more buttons). In particular, the control circuit 110 may control the operations of the display control IC 100, and these operations may comprise:

(1) utilizing the video stream processing circuit 120 to perform video stream processing such as video stream reception, etc.;

(2) utilizing the image processing circuit 130 to perform the image processing such as image brightness adjustment, color temperature adjustment, etc.; and (3) utilizing the display output control circuit 140 to perform display output control, for example, generate associated display control signals to control the display output module 10P to perform display operations;

but the present invention is not limited thereto. The display control IC 100 can utilize the plurality of terminals thereof to perform signal transmission with one or more external devices located outside the display device 10, and more particularly, utilize the video input terminal DP_in to receive a video input signal such as a video stream from a video source device through the video input port P_IN. Examples of the video stream may include, but are not limited to: Single Stream Transport (SST) video streams and Multi-Stream Transport (MST) video streams. When there is a need, the display control IC 100 can utilize the video decoder 132 to perform video decoding on encoded data. In addition, the VO generator 134 can generate an input vertical synchronization (IVS) signal IVS0 for controlling the playback of the video data. For example, the video decoder 132 can perform video decoding on the encoded data to generate decoded data as the video data, but the invention is not limited thereto. Additionally, the display output control circuit 140 can perform the display output control, where the display output control circuit 140 can generate a set of display control signals to control the display output module 10P to perform display operations, and the set of display control signals may comprise a display vertical synchronization (DVS) signal DVS0 for being used as timing reference for a timing controller TCON within the display output module 10P.

The IVS signal IVS0 is generated in the display control IC 100 (e.g., the VO generator 134). In an initial stage, the phase relationship between the IVS signal IVS0 and the DVS signal DVS0 may be random. The display control IC 100 can quickly make the timing of the IVS signal IVS0 be associated with the timing of the DVS signal DVS0, and more particularly, achieve frame lock, for example, the respective frame rates of the IVS signal IVS0 and the DVS signal DVS0 are equal to each other or have a multiple relationship (e.g., one of the respective frame rates of the IVS signal IVS0 and the DVS signal DVS0 is a multiple of the other of the respective frame rates of the IVS signal IVS0 and the DVS signal DVS0). Regarding establishing this association, during the time interval between a first time point and a second time point at which two consecutive pulses among a plurality of pulses carried by the DVS signal DVS0 appear, respectively, the display output control circuit 140 can output a reset signal RST to the VO generator 134 at an intermediate time point corresponding to a predetermined timing ratio to reset the VO generator 134, to make timing of the IVS signal IVS0 be associated with the timing of the DVS signal DVS0, where the first time point is earlier than the second time point. For example, the ratio of the time difference between the intermediate time point and the first time point to the time difference between the second time point and the first time point can be equal to the predetermined timing ratio.

Based on the architecture shown in FIG. 1, the display control IC 100 can effectively reduce the time to achieve the above-mentioned frame lock, for example, complete frame lock within two frames, in order to properly control the display operations, and more particularly, prevent the problems of the related art, such as the problem that the display panel enters a protection mode and stops displaying.

Figure 2:
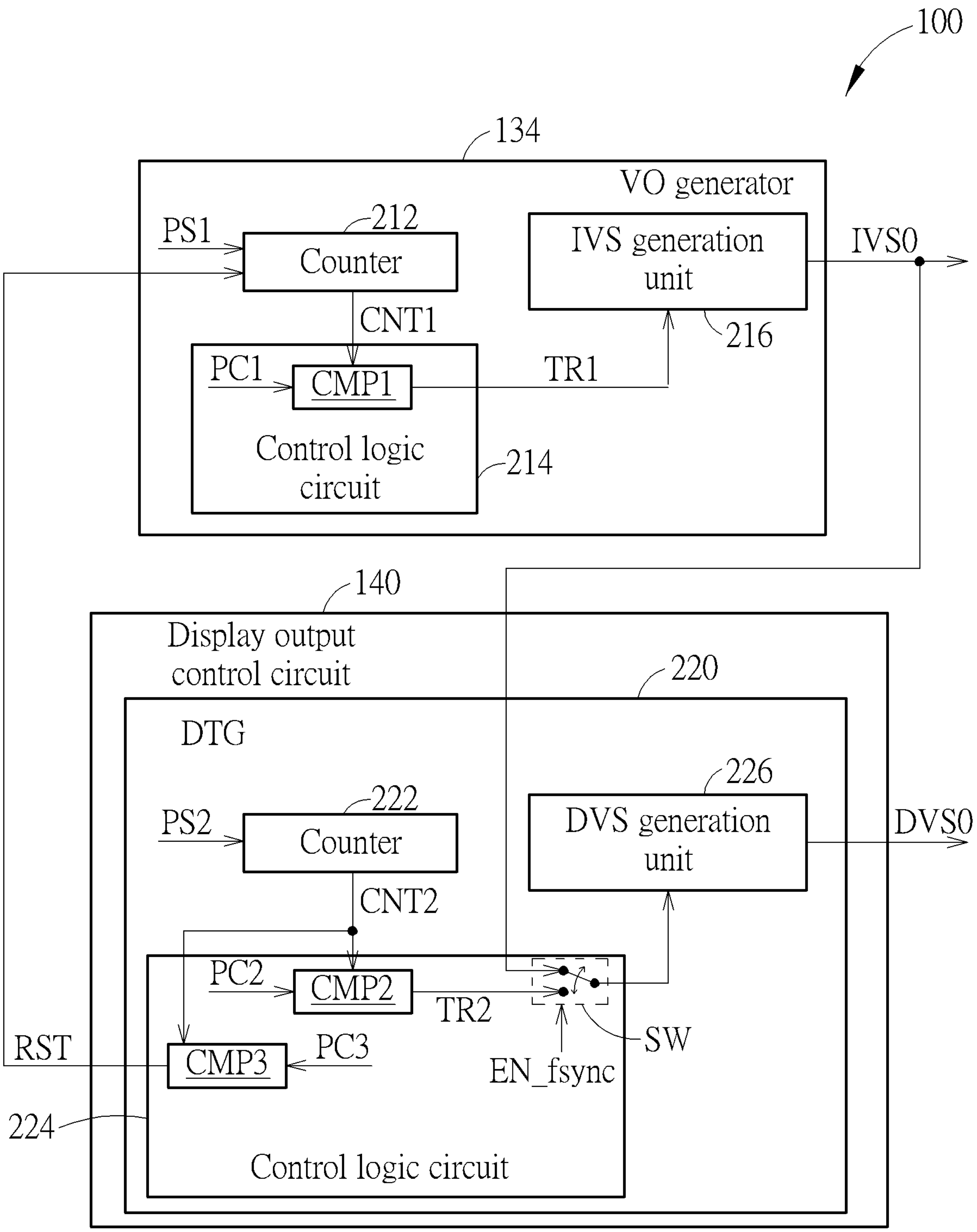
FIG. 2 illustrates some implementation details of the display control integrated circuit shown in FIG. 1 according to an embodiment of the present invention.

FIG. 2 illustrates some implementation details of the display control IC 100 shown in FIG. 1 according to an embodiment of the present invention. The VO generator 134 may comprise a counter 212, a control logic circuit 214, and an input vertical synchronization (IVS) generation unit (referred to as IVS generation unit for brevity) 216, which may be coupled to each other as shown in the upper half of FIG. 2, where the control logic circuit 214 may comprise a comparator CMP1. The display output control circuit 140 may comprise a display timing generator (DTG) 220 for generating display timing, and the DTG 220 may comprise a counter 222, a control logic circuit 224, and a display vertical synchronization (DVS) generation unit (referred to as DVS generation unit for brevity) 226, which can be coupled to each other as shown in the lower half of FIG. 2, where the control logic circuit 224 may comprise comparators CMP2 and CMP3 and a switching circuit SW.

The counter 212 can count according to a periodic signal PS1 (e.g., a frequency-divided signal of a clock signal) to respectively generate a plurality of counting results {CNT1}, such as first counter values (e.g., a certain value corresponding to a certain scan line number) in a first predetermined value range (e.g., a value range within a first scan line total count), where the periodic signal PS1 may have a first predetermined period or a first predetermined frequency (e.g., 24 Hz, 25 Hz, 30 Hz, 50 Hz or 60 Hz), which can be determined according to the frame rate of the video stream. The control logic circuit 214 (e.g., the comparator CMP1) can generate a trigger signal TR1 according to at least one counting result CNT1 among the plurality of counting results {CNT1}, and more particularly, generate the trigger signal TR1 (e.g., at least one pulse carried by the trigger signal TR1) when the counting result CNT1 reaches (e.g., equals to) a predetermined counter value PC1. According to the trigger signal TR1, the IVS generation unit 216 can generate the IVS signal IVS0 (e.g., at least one pulse carried by the IVS signal IVS0, corresponding to the at least one pulse carried by the trigger signal TR1). For example, the counter 212 can count down starting from the first scan line total count, and the control logic circuit 214 (e.g., the comparator CMP1) can control the IVS generation unit 216 through the trigger signal TR1 to generate any pulse among the at least one pulse carried by the IVS signal IVS0 when the countdown ends, where the any pulse may be referred to as an IVS pulse, but the present invention is not limited thereto. Regarding the above reset of the VO generator 134, the generation of an initial pulse of a series of periodic pulses (e.g., periodic pulses after reset) among a plurality of pulses carried by the IVS signal IVS0 may be triggered by the reset signal RST.

In addition, the DTG 220 can be arranged to generate the DVS signal DVS0. The counter 222 can count according to a periodic signal PS2 (e.g., a frequency-divided signal of a display clock signal DCLK among the set of display control signals) to respectively generate a plurality of counting results {CNT2}, such as second counter values (e.g., a certain value corresponding to a certain scan line number) in a second predetermined value range (e.g., a value range within a second scan line total count), where the periodic signal PS2 may have a second predetermined period or a second predetermined frequencies, which can be determined according to the display refresh rate of the display output module 10P (e.g., the display panel such as the LCD panel), and the first predetermined period and the second predetermined period may be the same as or different from each other. The control logic circuit 224 (e.g., the comparator CMP2) can generate a trigger signal TR2 according to at least one counting result CNT2 among the plurality of counting results {CNT2}, and more particularly, generate the trigger signal TR2 (e.g., at least one pulse carried by the trigger signal TR2) when the counting result CNT2 reaches (e.g., equals to) a predetermined counter value PC2. According to the trigger signal TR2, the DVS generation unit 226 can generate the DVS signal DVS0 (e.g., at least one pulse carried by the DVS signal DVS0, corresponding to the at least one pulse carried by the trigger signal TR2). For example, the counter 222 can count down starting from the second scan line total count, and the control logic circuit 224 (e.g., the comparator CMP2) can control the DVS generation unit 226 through the trigger signal TR2 to generate any pulse among the at least one pulse carried by the DVS signal DVS0 when the countdown ends, where the any pulse may be referred to as a DVS pulse, but the invention is not limited thereto.

Please note that the predetermined timing ratio may correspond to a predetermined counter value PC3. Under the control of the control logic circuit 224, when any counting result CNT2 of the counting results {CNT2} matches the predetermined counter value PC3, the display output control circuit 224 can output the reset signal RST to the VO generator 134 to the VO generator 134 to reset the VO generator 134. For example, the comparator CMP3 can compare the plurality of counting results {CNT2} with the predetermined counter value PC3 to selectively output the reset signal RST to the VO generator 134, and more particularly, when the counting result CNT2 reaches (e.g., equals to) the predetermined counter value PC3, generate the reset signal RST (e.g., a pulse carried by the reset signal RST) to reset the VO generator 134.

After performing the above-mentioned reset of the VO generator 134 (e.g., at a predetermined point after the reset operation), the control logic circuit 224 can enable frame synchronization (which can be referred to as "fsync" for brevity), and more particularly, utilize a frame synchronization enable signal EN_fsync to control the switching circuit SW to receive and output the IVS signal IVS0 (rather than the trigger signal TR2) to allow the DVS generation unit 226 to receive the IVS signal IVS0 (rather than the trigger signal TR2). In this situation, the generation of a series of periodic pulses (e.g., the periodic pulses carried by the DVS signal DVS0 since the frame synchronization is enabled) among the plurality of pulses carried by the DVS signal DVS0 can be triggered by the IVS signal IVS0 (e.g., the periodic pulses carried by the IVS signal IVS0 since the frame synchronization is enabled). For brevity, similar descriptions for this embodiment are not repeated in detail here.

According to some embodiments, since the display output control circuit 140 (e.g., DTG 220) can reset the data enable region of the DVS signal DVS0 at the moment when the frame synchronization is enabled, the display output control circuit 140 (e.g., DTG 220) can enables the frame synchronization in the front porch region (e.g., the blanking region before a certain DVS pulse carried by the DVS signal DVS0) of the display timing to ensure the normal operations of the display device 10.

Figure 3:
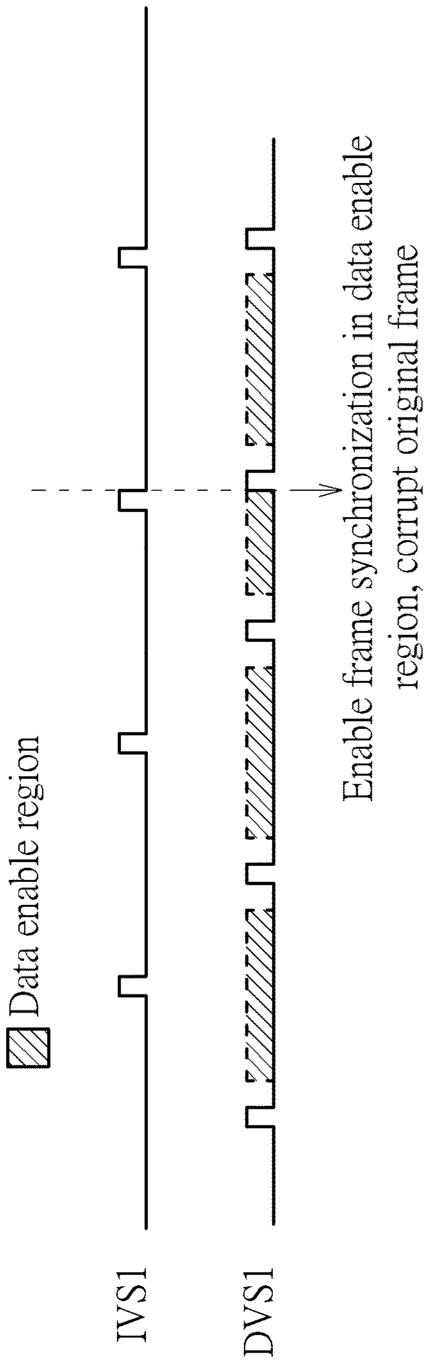
FIG. 3 illustrates an example of signal adjustment in a first control scheme.

FIG. 3 illustrates an example of signal adjustment in a first control scheme. For better comprehension, assume that a certain display device operates according to the first control scheme to try solving the problem of the random phase relationship between an IVS signal IVS1 and a DVS signal DVS1. This display device enables frame synchronization in the data enable region of the DVS signal DVS1 and therefore corrupts the original frame.

Figure 4:
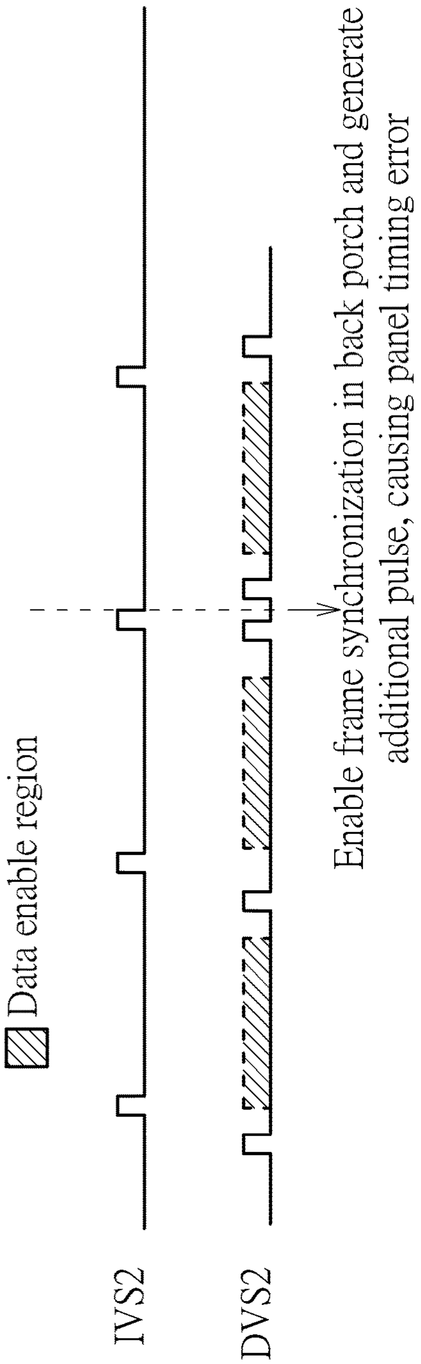
FIG. 4 illustrates an example of signal adjustment in a second control scheme.

FIG. 4 illustrates an example of signal adjustment in a second control scheme. For better comprehension, assume that a certain display device operates according to the second control scheme to try solving the problem of the random phase relationship between an IVS signal IVS2 and a DVS signal DVS2. This display device enables frame synchronization in the back porch region of the DVS signal DVS2 and generates an additional pulse, causing the panel timing error.

Figure 5:
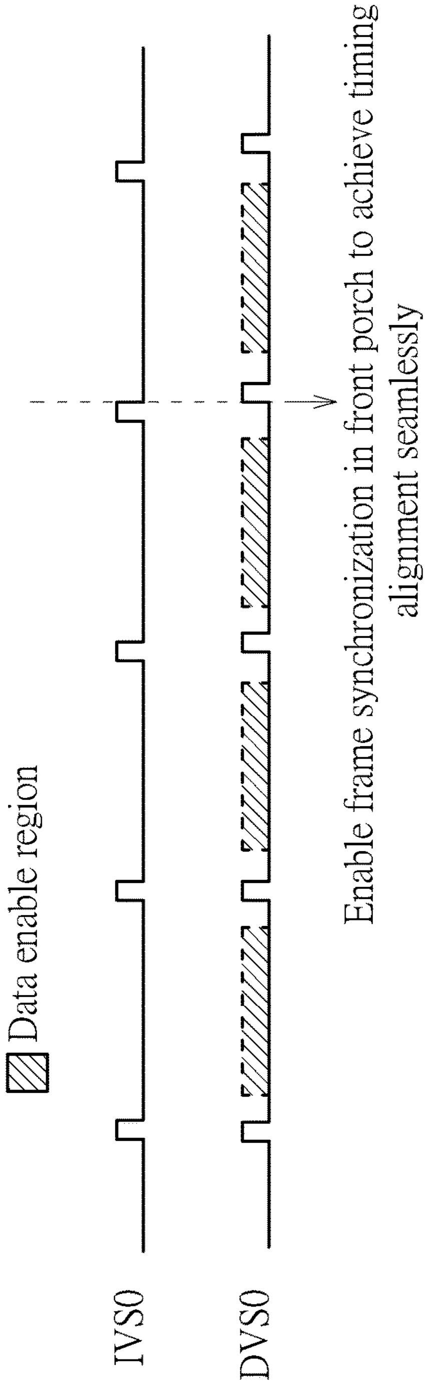
FIG. 5 illustrates a reset control scheme of a method for performing video output generator reset control in a display device such as the display device shown in FIG. 1 according to an embodiment of the present invention, wherein the method can be applied to the display device shown in FIG. 1 and the display control integrated circuit therein.

FIG. 5 illustrates a reset control scheme of a method for performing VO generator reset control in a display device such as the display device 10 shown in FIG. 1 according to an embodiment of the present invention, wherein the method can be applied to the display device 10 shown in FIG. 1 and the display control IC 100 therein. The display control IC 100 can enable the frame synchronization in the front porch (e.g., the front porch region) of the DVS signal DVS0 to achieve timing alignment seamlessly. For example, the display output control circuit 140 (e.g., the DTG 220) can reset the counter 212 through the reset signal RST at the intermediate time point corresponding to the predetermined timing ratio, to make the timing of the IVS signal IVS0 be associated with the timing of the DVS signal DVS0, and then enable the frame synchronization to achieve the timing alignment. In addition, the generation of at least one pulse of a first series of periodic pulses (e.g., the periodic pulses before the reset operation) among the plurality of pulses carried by the IVS signal IVS0 may be triggered by the trigger signal TR1, and the generation of an initial pulse of a second series of periodic pulses (e.g., the periodic pulses after the reset operation) among the plurality of pulses carried by the IVS signal IVS0 is triggered by the reset signal RST, where the first series of periodic pulses appear/occur earlier than the second series of periodic pulses. For brevity, similar descriptions for this embodiment are not repeated in detail here.

Figure 6:
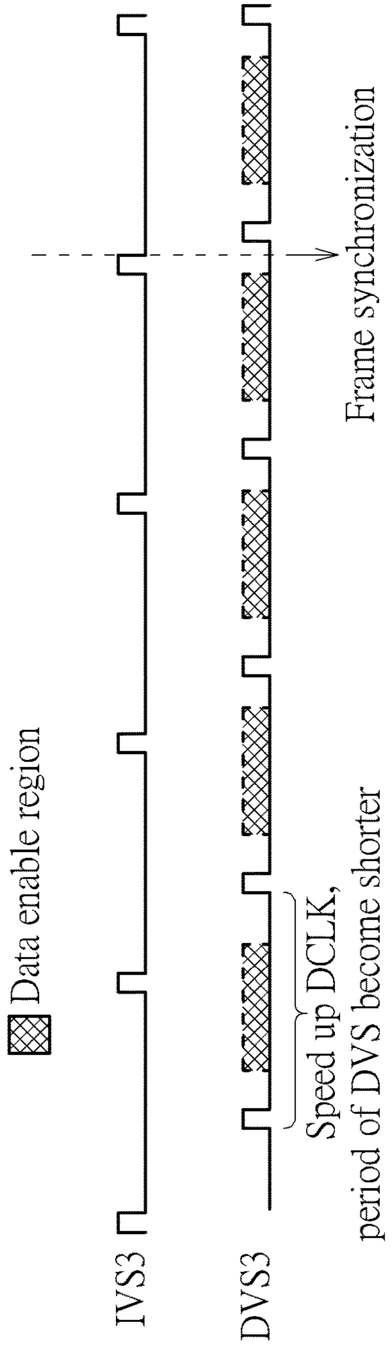
FIG. 6 illustrates an example of signal adjustment in a display-clock-based control scheme.

FIG. 6 illustrates an example of signal adjustment in a display-clock-based control scheme. For better comprehension, assume that a certain display device operates according to the display-clock-based control scheme to try solving the problem of the random phase relationship between an IVS signal IVS3 and a DVS signal DVS3. This display device speeds up the display clock signal DCLK (e.g., increases its frequency), so that the period of the DVS signal DVS3 becomes shorter. This display device makes the respective periods of the IVS signal IVS3 and the DVS signal DVS3 not match with each other to try increasing the probability of finding a suitable time point for enabling frame synchronization, but it typically needs to take a long time to wait, which may cause this display device to fail to pass some tests such as a boot-up time test (e.g., the test that the time to achieve normal display of image(s) since the beginning of boot-up should be less than a certain length of time). As the start phase of the IVS signal IVS3 is random at different times of boot-up, the time when this display device achieves frame lock cannot be determined. Additionally, display panels with poorer compatibility (e.g., organic light-emitting diode (OLED) display panels) typically cannot accept large timing changes, and this makes the adjustable range of the display clock signal DCLK (e.g., its frequency) become smaller, and therefore increases the time to achieve frame lock.

Figure 7:
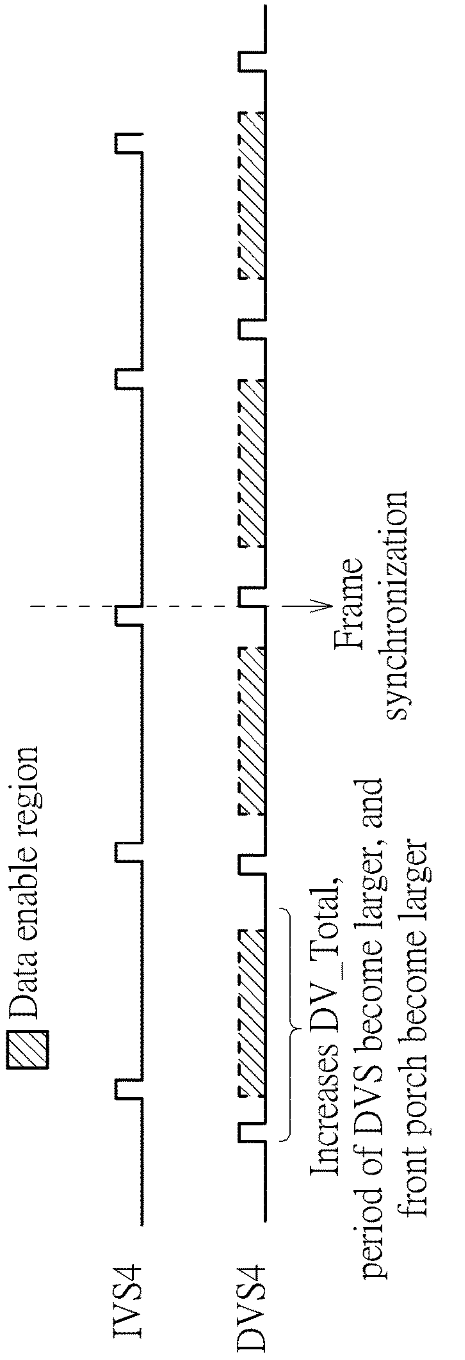
FIG. 7 illustrates an example of signal adjustment in a scan-line-total-count-based control scheme.

FIG. 7 illustrates an example of signal adjustment in a scan-line-total-count-based control scheme. For better comprehension, assume that a certain display device operates according to the scan-line-total-count-based control scheme to try solving the problem of the random phase relationship between an IVS signal IVS4 and a DVS signal DVS4. This display device increases the parameter DV_Total representing the scan line total count, so that the period of the DVS signal DVS4 becomes larger, and the front porch of the DVS signal DVS4 becomes larger. This display device makes the respective periods of the IVS signal IVS4 and the DVS signal DVS4 not match with each other to try increasing the probability of finding a suitable time point for enabling frame synchronization, but it typically needs to take a long time to wait, which may cause this display device to fail to pass some tests such as the start-playing reaction time test (e.g., the test of the time from clicking or touching the user interface (UI) about playing back a video to actually starting displaying images). As the start phase of the IVS signal IVS4 at different times (e.g., the start phase at different times of start of different videos) is random, the time when this display device achieves frame lock cannot be determined. Additionally, display panels with poorer compatibility (e.g., OLED display panels) typically cannot accept large timing changes, and this makes the adjustable range of the parameter DV Total become smaller, and therefore increases the time to achieve frame lock.

Figure 8:
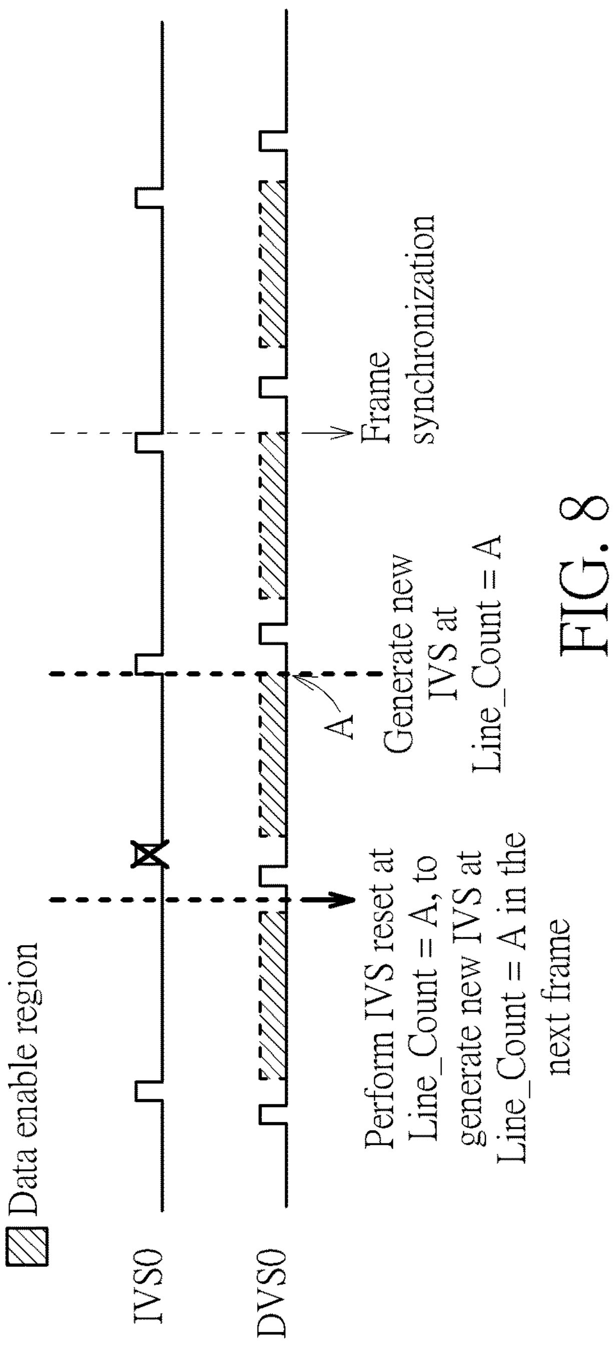
FIG. 8 illustrates the reset control scheme of the method according to another embodiment of the present invention.

FIG. 8 illustrates the reset control scheme of the method according to another embodiment of the present invention. The display control IC 100 can reset the counter 212 through the reset signal RST when the scan line count Line_Count of the video output by the display output control circuit 140 reaches a predetermined scan line count A relative to the DVS signal DVS0 (e.g., a certain pulse carried by the DVS signal DVS0), to make the timing of the IVS signal IVS0 be associated with the timing of the DVS signal DVS0, and enable the frame synchronization in the front porch (e.g., front porch region) of the DVS signal DVS0 to seamlessly achieve timing alignment.

For better comprehension, these pulses of the DVS signal DVS0 shown in FIG. 8 and the first two pulses thereof (e.g., the two pulses shown in the lower left corner of FIG. 8) can be taken as examples of the plurality of pulses and the two consecutive pulses, respectively, the time point corresponding to Line_Count=A can be taken as an example of the intermediate time point, and the time interval between the time point at which the data enable region illustrated between the first two pulses ends and the time point at which the second pulse among the first two pulses begins can be taken as an example of the front porch. As indicated by the downward arrow shown in the left half of FIG. 8, the display control IC 100 can perform the IVS reset operation at Line_Count=A, and more particularly, reset the counter 212 with the reset signal RST to make the counter 212 restart counting, to control the VO generator 134 to generate a new IVS such as a new pulse of the IVS signal IVS0 at Line_Count=A in the next frame (relative to the DVS signal DVS0), as illustrated with the vertical dashed line in the center of FIG. 8. Thus, the phase of the IVS signal IVS0 can be directly aligned to the front porch of the DVS signal DVS0 in the above-mentioned next frame (e.g., at Line_Count=A therein), and then the control logic circuit 224 can enable the frame synchronization to make, starting from the next frame relative to the IVS signal IVS0, the DVS signal DVS0 be synchronized with the IVS signal IVS0, and more particularly, generate a corresponding new pulse along with any new pulse of the IVS signal IVS0 (such as the new pulse mentioned above). Therefore, the display control IC 100 can align the timing of the DVS signal DVS0 with the timing of the IVS signal IVS0 in only two frames. For brevity, similar descriptions for this embodiment are not repeated in detail here.

Figure 9:
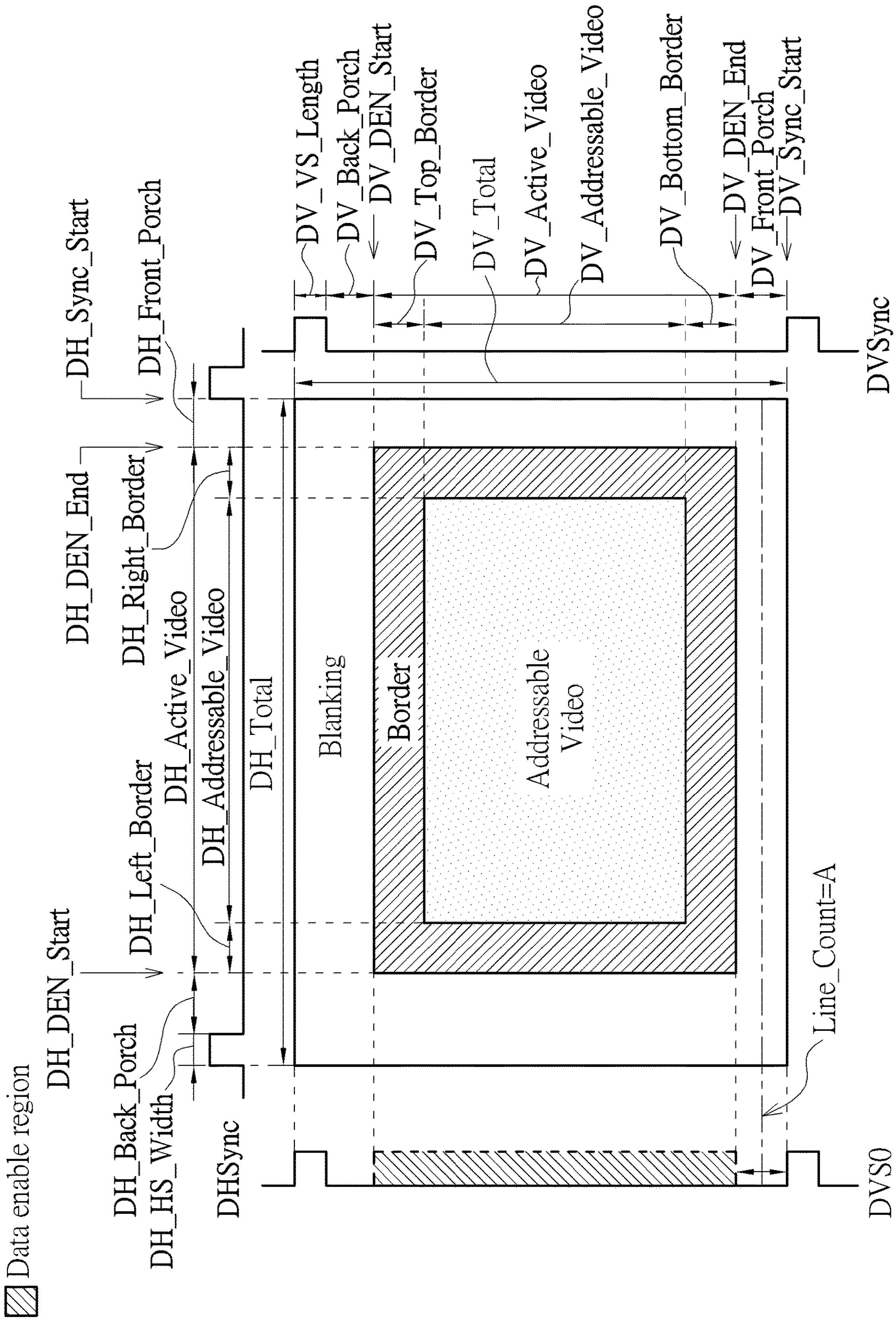
FIG. 9 illustrates an example of a video format of the video output by the display output control circuit shown in FIG. 1.

FIG. 9 illustrates an example of a video format of the video output by the display output control circuit 140 shown in FIG. 1, where the video format can be compatible with the video format of the Video Electronics Standards Association (VESA) Display Monitor Timing (DMT) standard, and the synchronization signal DVSync can be taken as an example of the DVS signal DVS0, but the invention is not limited thereto. For better comprehension, after frame lock is achieved, the synchronization signals DHSync and DVSync can be similar to the synchronization signals HSync and VSync in the video format of the VESA DMT standard, respectively, the parameters DH_DEN_Start, DH_DEN_End, DH_Sync_Start, DH_HS_Width, DH_Back_Porch, DH_Active_Video, DH_Front_Porch, DH_Left_Border, DH_Addressable_Video, DH_Right_Border, DH_Total, DV_DEN_Start, DV_DEN_End, DV_Sync_Start, DV_VS_Length, DV_Back_Porch, DV_Active_Video, DV_Front_Porch, DV_Top_Border, DV_Addressable_Video, DV_Bottom_Border and DV_Total can be similar to the associated parameters in the video format of the VESA DMT standard, respectively, and the blanking, the border, the addressable video, etc. can be similar to the blanking, the border, the addressable video, etc. in the video format of the VESA DMT standard, respectively. As the video format of the VESA DMT standard is well known to those in the related art, those in the related art should understand the meanings of the video format shown in FIG. 9 when obtaining the teachings of the present invention.

In addition, the time interval indicated by the parameter DV_Front_Porch can be taken as an example of the front porch. For better comprehension, the data enable region shown in FIG. 9 may represent any data enable region of at least the first two data enable regions (e.g., the two data enable regions shown in the lower left corner of FIG. 8) among the multiple data enable regions shown in FIG. 8. Any of the scan line count Line_Count and the parameter DV_Total can be measured starting from the upper boundary of the blanking shown in FIG. 9 (e.g., the time point at which a corresponding pulse of the synchronization signal DVSync appears, as shown in the upper right corner of FIG. 9). The predetermined scan line count A can be determined in advance to make Line_Count=A occurs in the front porch, such as the time interval indicated by the parameter DV_Front_Porch, that is, the time interval between the time point (e.g., the data enable end time point) indicated by the parameter DV_DEN_End and the time point at which the next pulse of the synchronization signal DVSync appears. For example, the predetermined scan line count A and some parameters may have the following relationship:

$$(DV\_VS\_Length+DV\_Back\_Porch+DV\_Active\_Video)<A<DV\_Total;$$

where the three time intervals indicated by the parameters DV_VS_Length, DV_Back_Porch and DV_Active_Video may represent the synchronization pulse time (e.g., the pulse width, such as the pulse length measured along the time axis), the back porch and the active video time regarding the synchronization signal DVSync, respectively.

Based on the reset control scheme, the ratio of the time difference between the intermediate time point (e.g., the time point corresponding to Line_Count=A) and the first time point (e.g., the time point at which the corresponding pulse of the synchronization signal DVSync appears, as shown in the upper right corner of FIG. 9) to the time difference between the second time point (e.g., the time point at which the next pulse of the synchronization signal DVSync appears) and the first time point can be equal to the predetermined timing ratio such as (A/DV_Total).

Figure 10:
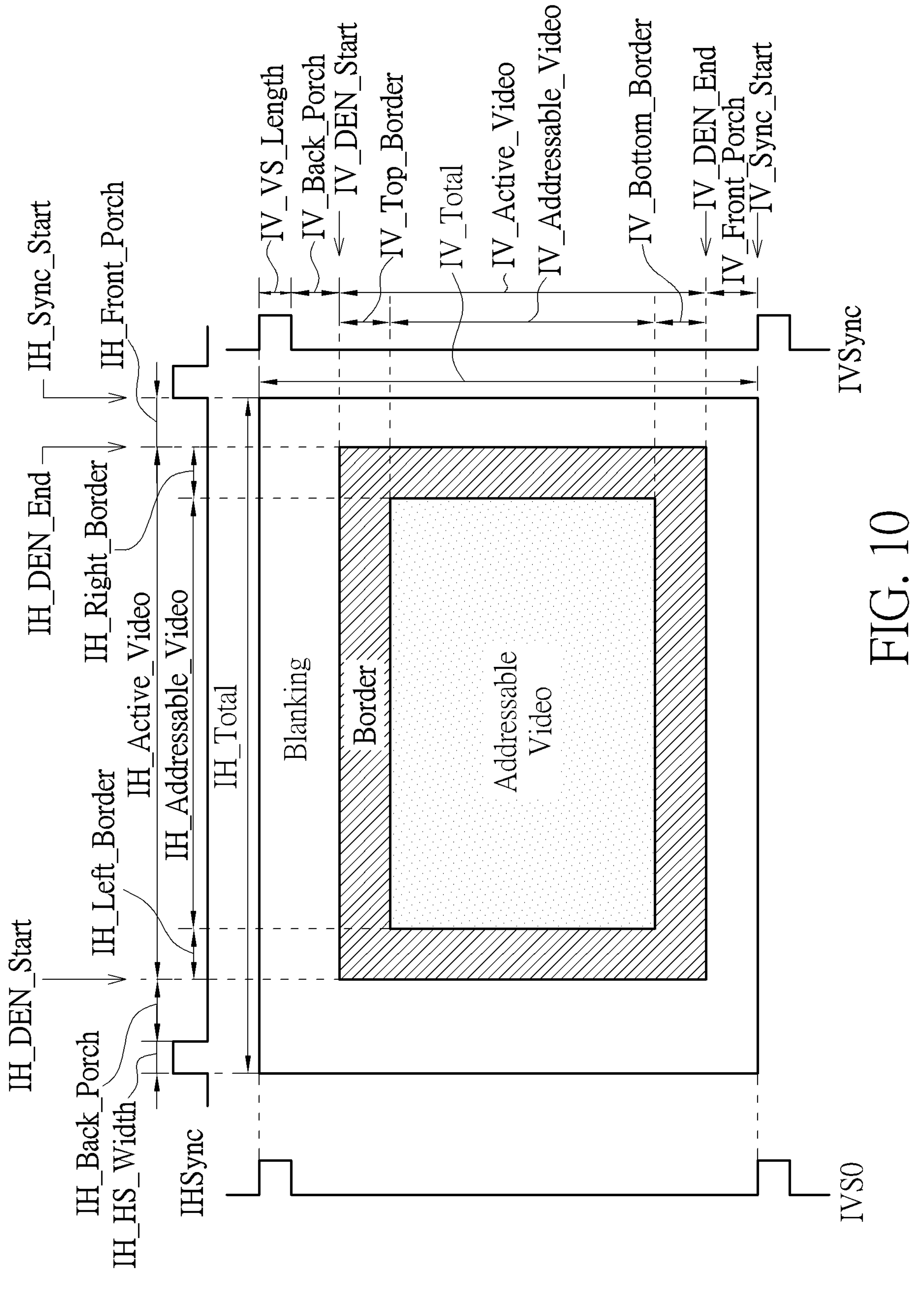
FIG. 10 illustrates an example of a video format of the video output by the image processing circuit shown in FIG. 1.

FIG. 10 illustrates an example of a video format of the video output by the image processing circuit 130 shown in FIG. 1, where the video format can be compatible with the video format of the VESA DMT standard, and the synchronization signal IVSync can be taken as an example of the IVS signal IVS0, but the present invention is not limited thereto. For better comprehension, after frame lock is achieved, the synchronization signals IHSync and IVSync can be similar to the synchronization signals HSync and VSync in the video format of the VESA DMT standard, respectively, the parameters IH_DEN_Start, IH_DEN_End, IH_Sync_Start, IH_HS_Width, IH_Back_Porch, IH_Active_Video, IH_Front_Porch, IH_Left_Border, IH_Addressable_Video, IH_Right_Border, IH_Total, IV_DEN_Start, IV_DEN_End, IV_Sync_Start, IV_VS_Length, IV_Back_Porch, IV_Active_Video, IV_Front_Porch, IV_Top_Border, IV_Addressable_Video, IV_Bottom_Border and IV_Total can be similar to the associated parameters in the video format of the VESA DMT standard, respectively, and the blanking, the border, the addressable video, etc. can be similar to the blanking, the border, the addressable video, etc. in the video format of the VESA DMT standard, respectively. As the video format of the VESA DMT standard is well known to those in the related art, those in the related art should understand the meanings of the video format shown in FIG. 10 when obtaining the teachings of the present invention.

The display control IC 100 of the present invention can align the timing of the DVS signal DVS0 with the timing of the IVS signal IVS0 in only two frames to complete frame lock to properly control the display operations. In addition, the display control IC 100 of the present invention does not need to change any of the display clock (e.g., the frequency of the display clock signal DCLK) and the scan line total count (e.g., the parameter DV_Total), and therefore can prevent the related art problems such as the panel compatibility problems.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display device, applicable to performing video output generator reset control according to a reset signal, the display device comprising:

- a display output module for displaying a plurality of images; and
- a display control integrated circuit (IC), arranged to receive a video input signal comprising a video stream and generate video data according to the video input signal, comprising:
  - an image processing circuit, comprising:
    - a video output generator, arranged to generate an input vertical synchronization signal for controlling playback of the video data, the input vertical synchronization signal generated according to a first periodic signal having a frequency according to a frame rate of the video stream, and when the reset signal is received, the video output generator is arranged to control timing of a pulse of the input vertical synchronization signal according to the reset signal; and
    - a display output control circuit, coupled to the video output generator, wherein the display output control circuit generates a set of display control signals to control the display output module within the display device to perform display operations, and the set of display control signals includes a display clock signal and a single display vertical synchronization signal for being used as timing reference of a timing controller within the display output module, the single vertical synchronization signal generated according to a second periodic signal being a frequency-divided signal of the display clock signal and having a frequency according to a display refresh rate of the display output module, and the display output control circuit generates the reset signal according to a comparison of timing of a plurality of pulses carried by the single display vertical synchronization signal, comprising:
      - generating a plurality of second counting results according to the second periodic signal; and
      - when any second counting result among the plurality of second counting results matches a third predetermined counter value, generating and outputting the reset signal to the video output generator;

wherein the third predetermined counter value corresponds to a predetermined timing ratio, during a time interval between a first time point and a second time point at which two consecutive pulses among the plurality of pulses carried by the single display vertical synchronization signal respectively appear, the display output control circuit generates and outputs the reset signal to the video output generator at an intermediate time point between the two consecutive pulses corresponding to the predetermined timing ratio, the video output generator triggers a pulse of the input vertical synchronization signal at the intermediate time point in response to receiving the reset signal, and the triggered pulse of the input vertical synchronization signal makes timing of the input vertical synchronization signal be associated with timing of the single display vertical synchronization signal, wherein the first time point is earlier than the second time point and the video output generator associates timing of the input vertical synchronization signal with timing of the single display vertical synchronization signal in response to the reset signal.

2. The display device of claim 1, wherein a ratio of a time difference between the intermediate time point and the first time point to a time difference between the second time point and the first time point is equal to the predetermined timing ratio.

3. The display device of claim 1, wherein the video output generator comprises:

a first counter, for receiving the first periodic signal and the reset signal, and arranged to count according to the first periodic signal to generate a plurality of first counting results respectively, wherein the reset signal resets the first counter;

a first control logic circuit, coupled to the first counter, arranged to generate a first trigger signal when at least one first counting result among the plurality of first counting results is equal to a first predetermined counter value; and an input vertical synchronization generation unit, coupled to the first control logic circuit, arranged to generate the input vertical synchronization signal according to the first trigger signal.

4. The display device of claim 3, wherein the reset signal resets the first counter at the intermediate time point corresponding to the predetermined timing ratio, to make the timing of the input vertical synchronization signal be associated with the timing of the single display vertical synchronization signal.

5. The display device of claim 3, wherein generation of at least one pulse of a first series of periodic pulses among a plurality of pulses carried by the input vertical synchronization signal is triggered by the first trigger signal.

6. The display device of claim 5, wherein generation of an initial pulse of a second series of periodic pulses among the plurality of pulses carried by the input vertical synchronization signal is triggered by the reset signal, wherein the first series of periodic pulses appears earlier than the second series of periodic pulses.

7. The display device of claim 1, wherein generation of an initial pulse of a series of periodic pulses among a plurality of pulses carried by the input vertical synchronization signal is triggered by the reset signal.

8. The display device of claim 1, further comprising:

a video decoder, arranged to perform video decoding on encoded data to generate data as a processed video stream.

9. The display device of claim 1, wherein the display output control circuit comprises:

a display timing generator, arranged to generate the single display vertical synchronization signal, wherein the display timing generator comprises:

a second counter, arranged to count according to the second periodic signal to generate the plurality of second counting results respectively;

a second control logic circuit, coupled to the second counter, arranged to generate a second trigger signal when at least one second counting result among the plurality of second counting results is equal to a second predetermined counter value; and a display vertical synchronization generation unit, coupled to the second control logic circuit, arranged to generate the single display vertical synchronization signal according to the second trigger signal;

wherein under control of the second control logic circuit, when any second counting result among the plurality of second counting results matches the third predetermined counter value, the display output control circuit outputs the reset signal to the video output generator to reset the video output generator.

10. The display device of claim 9, wherein the second control logic circuit comprises:

a comparator, arranged to compare the plurality of second counting results with the third predetermined counter value to selectively output the reset signal to the video output generator.

* * * * *